United States Patent
Gopal (10) Patent No.: US 10,222,134 B2
(45) Date of Patent: Mar. 5, 2019

(54) DUAL LOOP COOLING SYSTEM ENERGY STORAGE AND REUSE

(71) Applicant: Ford Global Technologies, LLC, Dearborn, MI (US)

(72) Inventor: Ravi Gopal, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 15/287,525

(22) Filed: Oct. 6, 2016

(65) Prior Publication Data

US 2018/0100709 A1    Apr. 12, 2018

(51) Int. Cl.
| | |
|---|---|
| F28D 20/02 | (2006.01) |
| B60H 1/04 | (2006.01) |
| F01P 7/16 | (2006.01) |
| F01M 5/00 | (2006.01) |
| F16H 57/04 | (2010.01) |
| F28F 27/02 | (2006.01) |
| F28D 21/00 | (2006.01) |
| F28D 20/00 | (2006.01) |

(52) U.S. Cl.
CPC ............... *F28D 20/02* (2013.01); *B60H 1/04* (2013.01); *F01M 5/005* (2013.01); *F01P 7/16* (2013.01); *F16H 57/0412* (2013.01); *F28D 20/021* (2013.01); *F28D 20/028* (2013.01); *F28F 27/02* (2013.01); *F28D 2020/0078* (2013.01); *F28D 2021/008* (2013.01); *F28D 2021/0082* (2013.01); *F28D 2021/0084* (2013.01); *F28D 2021/0085* (2013.01); *F28D 2021/0089* (2013.01); *F28D 2021/0094* (2013.01)

(58) Field of Classification Search
CPC ...... F28D 20/02; F28D 20/021; F28D 20/028; F28D 27/02; F28D 2020/0078; F28D 2021/008; F28D 2021/0082; F28D 2021/0084; F28D 2021/0085; F01P 7/16; F16H 57/0412; B60H 1/143; B60H 1/00914; B60H 1/00921
USPC ................. 165/297, 104.11, 104.21, 104.17; 62/159, 244
See application file for complete search history.

(56) References Cited

U.S. PATENT DOCUMENTS

| | | | |
|---|---|---|---|
| 5,553,662 A | 9/1996 | Longardner et al. | |
| 6,705,101 B2 * | 3/2004 | Brotz | B60H 1/00 62/198 |
| 6,941,245 B2 | 9/2005 | Longnecker et al. | |
| 7,147,071 B2 | 12/2006 | Gering et al. | |
| 7,669,647 B2 * | 3/2010 | Tsubone | B60H 1/00492 123/142.5 R |
| 8,402,776 B2 | 3/2013 | Johnston et al. | |

(Continued)

*Primary Examiner* — Jianying Atkisson
*Assistant Examiner* — Joel Attey
(74) *Attorney, Agent, or Firm* — Julia Voutyras; McCoy Russell LLP (57) ABSTRACT

Methods and systems are provided for a dual loop coolant system used to control an engine temperature. In one example, cooling capacity is transferred from a low temperature loop to a heat exchanger, and cooling capacity stored in the heat exchanger is transferred to a high temperature loop (e.g., an engine coolant loop). The flow of coolant from the dual loop coolant system to the heat exchanger may be regulated responsive to a temperature of the coolant in each of the low temperature loop and the high temperature loop.

8 Claims, 5 Drawing Sheets

(56) References Cited

U.S. PATENT DOCUMENTS

| | | | | |
|---|---|---|---|---|
| 2003/0164001 A1* | 9/2003 | Vouzelaud | ......... | B60H 1/00885 62/244 |
| 2011/0214629 A1* | 9/2011 | Benoit | ...................... | F01P 1/06 123/41.09 |
| 2011/0232890 A9* | 9/2011 | Gering | ............... | B60H 1/00278 165/202 |
| 2012/0153718 A1 | 6/2012 | Rawlinson et al. | | |
| 2016/0138878 A1 | 5/2016 | Gopal | | |

* cited by examiner

DUAL LOOP COOLING SYSTEM ENERGY STORAGE AND REUSE

FIELD

The present description relates generally to methods and systems for a dual loop coolant system.

BACKGROUND/SUMMARY

A dual loop cooling system in a vehicle may include a low temperature coolant loop and a high temperature coolant loop. Typically, the low temperature coolant loop is designed to meet the cooling requirements of a charge air cooler, for cooling a condenser of an air conditioner of the vehicle, for transmission oil cooling, etc. The low temperature coolant loop may have adequate cooling capacity to cool the components at extreme temperature and/or operating conditions. The high temperature coolant loop may be an engine coolant system configured to decrease temperature of an engine block for maintaining the engine temperature for optimal engine functioning. The high temperature coolant loop may include a radiator, a water pump, coolant hoses, and other components.

The cooling capacity available in the high temperature coolant loop, especially during extreme temperature, may be limited. In one example, approach described in U.S. Pat. No. 6,941,245, this limitation of cooling capacity while cooling the engine may be handled by derating engine torque at extreme temperature and operating conditions.

However, the inventors herein have recognized potential issues with such systems. As one example, derating the engine torque to regulate engine temperature may compromise vehicle performance and diminish customer satisfaction.

The inventors herein propose systems and methods to address the above-described issues. In one example, a system includes a first coolant loop, a second coolant loop, separate from the first coolant loop, a heat exchanger configured to transfer heat between the first coolant loop and the second coolant loop, a bypass valve positioned between the first coolant loop to the heat exchanger, and a control valve positioned between the second coolant loop and the heat exchanger. The first coolant loop may be a low temperature coolant loop (for example, a liquid coolant loop for an air conditioner condenser) and the second coolant loop may be a high temperature coolant loop (for example, an engine coolant system). In one example, when additional cooling capacity is available in the first coolant loop, the bypass valve may direct coolant flow from the first coolant loop to the heat exchanger to transfer the additional cooling capacity to the heat exchanger. When additional cooling capacity is desired in the second coolant loop, the control valve may direct coolant flow between the heat exchanger and the second coolant loop to transfer the additional cooling capacity from the heat exchanger to the second coolant loop (e.g., to absorb heat from the second coolant loop).

In this way, a dual loop cooling system may transfer additional cooling capacity available in a low temperature loop to a high temperature loop through a heat exchanger or a thermal storage device without derating the engine, and thus maintaining optimal engine and vehicle operation. Additionally, use of a liquid coolant in the low temperature loop (instead of a refrigerant that needs a compressor), simplifies and reduces the cost and complexity of the dual loop cooling system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
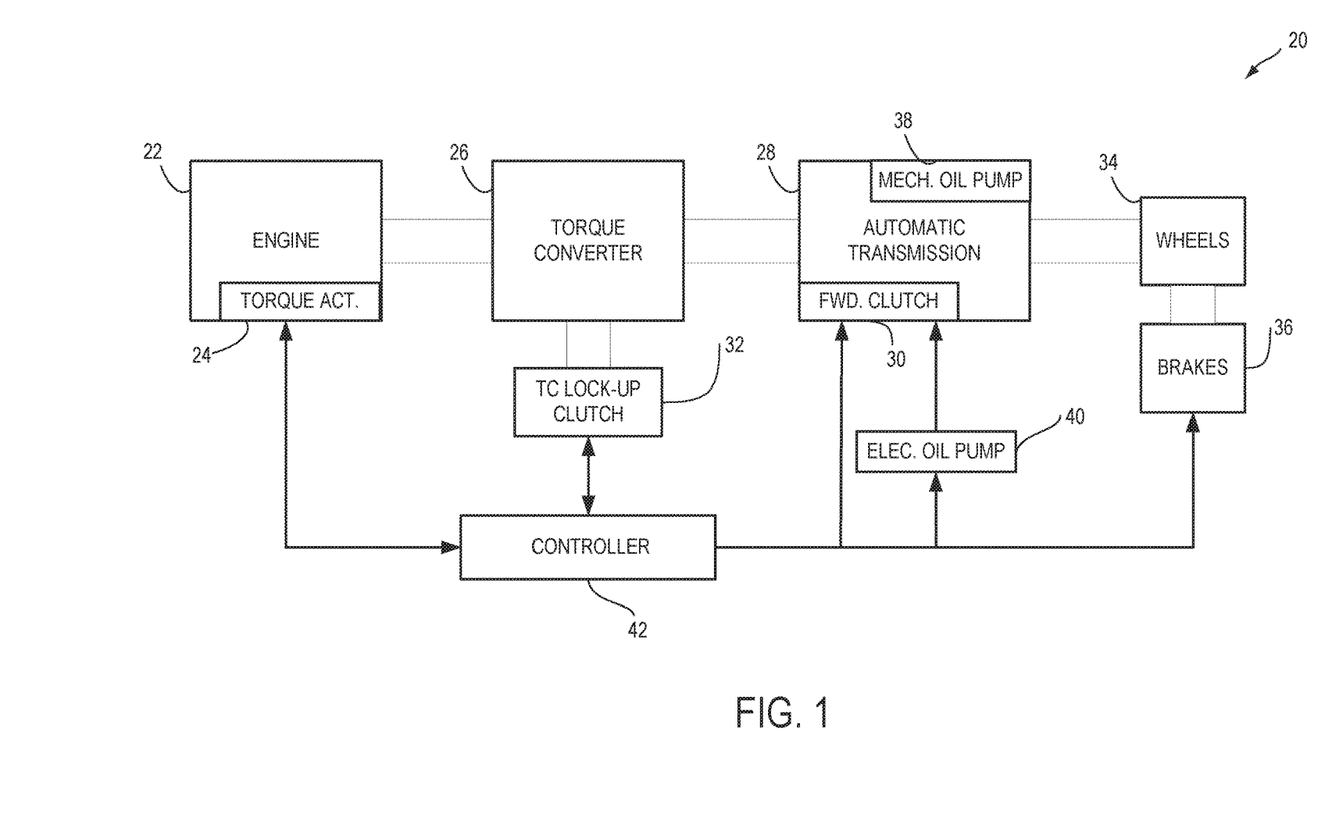
FIG. 1 shows an example vehicle system.

The following description relates generally to systems and methods for controlling coolant flow in a dual loop coolant system for transferring cooling capacity to and from a heat exchanger. The dual loop coolant system may be included in a vehicle system with an engine and associated components as illustrated in FIG. 1. The dual loop coolant system may include a low temperature coolant loop and a high temperature coolant loop. The low temperature coolant loop may include a liquid coolant, such as water. The high temperature coolant loop may be an engine coolant loop. Each of the low temperature coolant loop and the high temperature coolant loop may be coupled to a heat exchanger, as illustrated in the schematic in FIG. 2. A bypass valve may direct coolant flow from the low temperature coolant loop to the heat exchanger to transfer cooling capacity to one or more phase change materials (PCMs) inside the heat exchanger, without any mixing between the coolant and the PCM. A coolant valve may direct coolant from the high temperature coolant loop to flow through the heat exchanger and cooling capacity may be transferred from the PCM to the coolant in the high temperature loop without any mixing between the coolant and the PCM. FIG. 3 illustrates flow of coolant along the low temperature and the high temperature coolant loops. A position of each of the bypass valve and the coolant valve may be regulated responsive to temperature in the low temperature loop and the high temperature loop according to a method shown in FIG. 4. FIG. 5 shows an example of an operational map while operating the dual loop cooling system.

A dual loop coolant system may include a low temperature loop, for example, a water coolant system, cooling various components of a vehicle, including an air conditioner condenser, charge air coolers, transmission oil cooler, etc. In certain operating conditions, for example during low ambient temperature or when air conditioner is off, additional cooling capacity may be available in the low temperature coolant loop. This additional cooling capacity may be transferred to and stored in a heat exchanger or a thermal storage device coupled to the low temperature loop. The transfer of cooling capacity to the heat exchanger may occur without mixing of coolant in the low temperature loop and a heat exchange material, such as a phase change material (PCM), inside the heat exchanger.

The cooling capacity stored in the heat exchanger may be transferred to coolant in a high temperature coolant loop, such as engine coolant, when additional cooling capacity is required for cooling the engine by the high temperature loop. A first valve along the low temperature loop may direct coolant flow from the low temperature loop to first set of heat exchange tubes in the heat exchanger, without any mixing between the coolant and the PCM. A second valve along the high temperature loop may direct coolant flow from the high temperature loop to a second set of heat exchange tubes in the heat exchanger, without any mixing between the coolant and the PCM.

Transferring cooling capacity from a low temperature loop to a high temperature loop through a heat exchanger/ thermal storage device provides an efficient way to use the additional cooling capacity of the low temperature loop. In operating conditions when the engine coolant demands additional cooling, cooling capacity may be transferred from the heat exchanger to the high temperature coolant loop without derating the engine, thereby maintaining optimal engine and vehicle performance. The low temperature cooling loop may include a liquid coolant, such as water. Additionally, use of liquid coolant in the low temperature loop instead of a refrigerant that needs a compressor, simplifies and reduces the cost and complexity of the dual loop cooling system.

Figure 2:
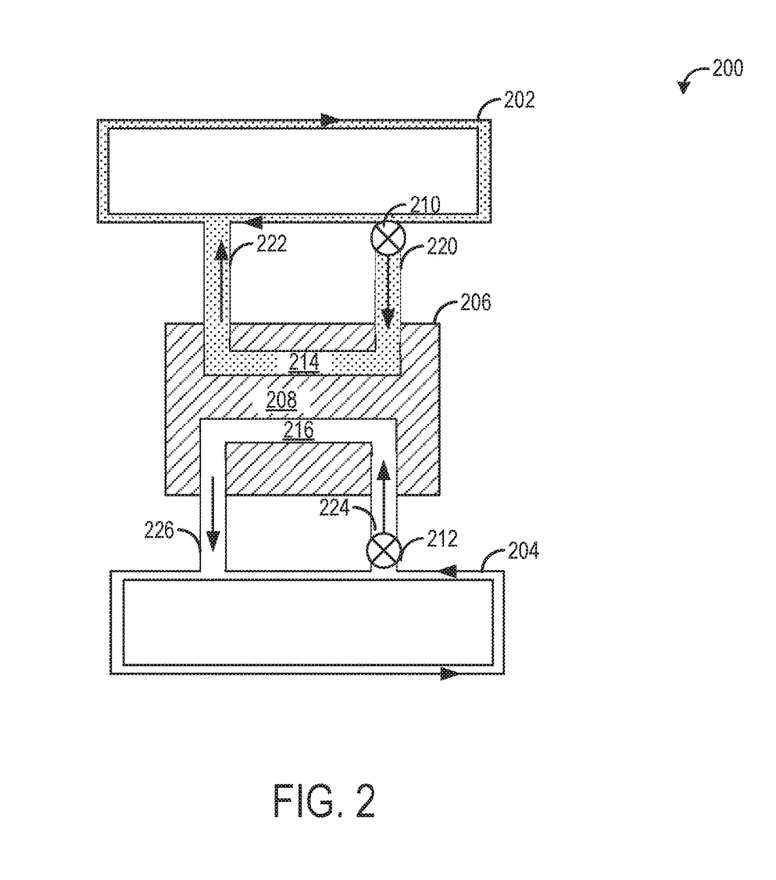
FIG. 2 shows a dual loop coolant system coupled to a heat exchanger.
Figure 3:
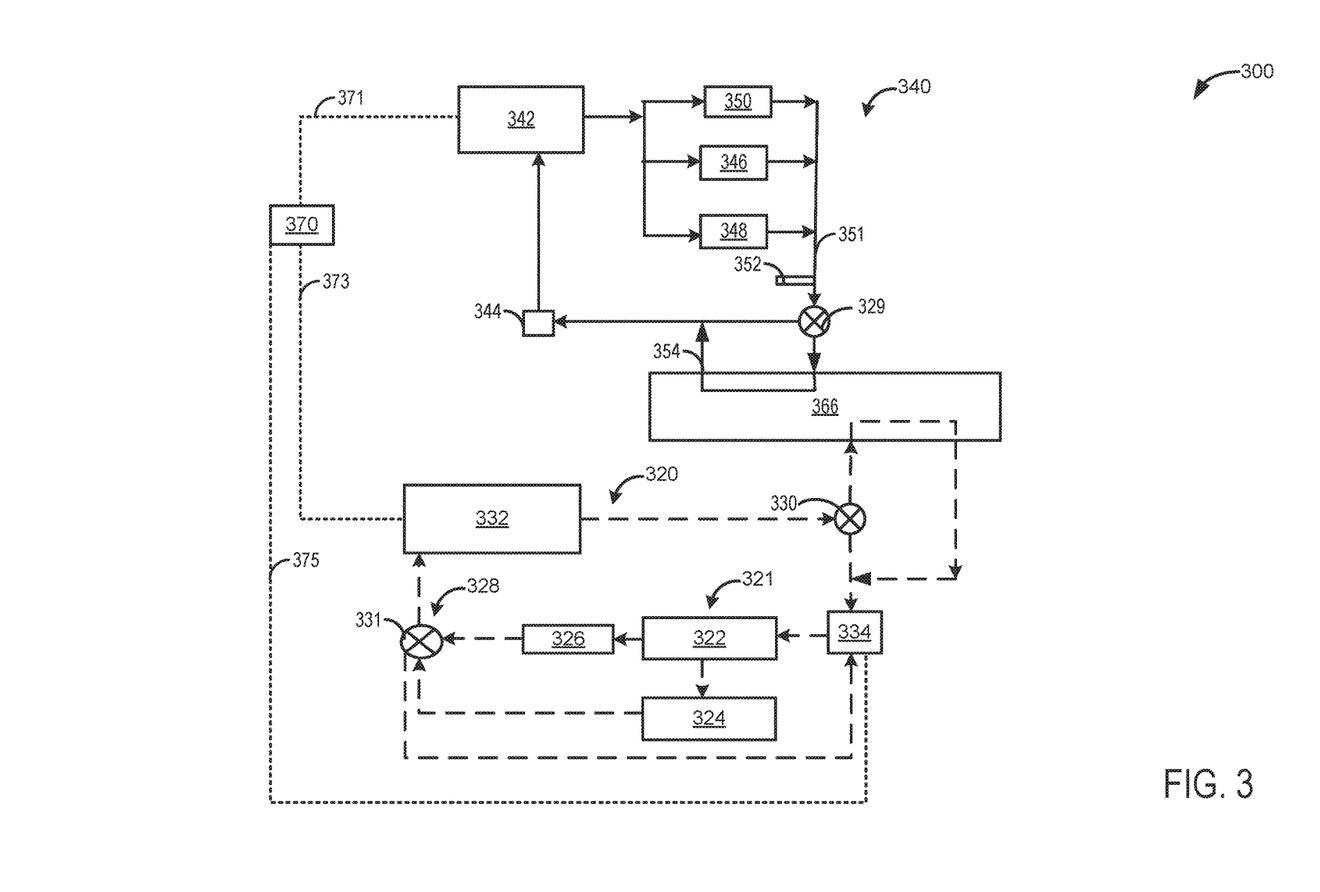
FIG. 3 illustrates a low temperature coolant loop and a high temperature coolant loop, each coupled to a heat exchanger.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 is a block diagram of a vehicle drive-train 20. Drive-train 20 may be powered by engine 22. In one example, engine 22 may be a gasoline engine. In alternate embodiments, other engine configurations may be employed, for example, a diesel engine. Engine 22 may be started with an engine starting system (not shown). Further, engine 22 may generate or adjust torque via torque actuator 24, such as a fuel injector, throttle, etc.

An engine output torque may be transmitted to torque converter 26 to drive an automatic transmission 28 by engaging one or more clutches, including forward clutch 30, where the torque converter may be referred to as a component of the transmission. As such, a plurality of such clutches may be engaged, as needed. The output of the torque converter may in turn be controlled by torque converter lock-up clutch 32. As such, when torque converter lock-up clutch 32 is fully disengaged, torque converter 26 transmits torque to automatic transmission 28 via fluid transfer between the torque converter turbine and torque converter impeller, thereby enabling torque multiplication. In contrast, when torque converter lock-up clutch 32 is fully engaged, the engine output torque is directly transferred via the torque converter clutch to an input shaft (not shown) of transmission 28. Alternatively, the torque converter lock-up clutch 32 may be partially engaged, thereby enabling the amount of torque relayed to the transmission to be adjusted. A controller may be configured to adjust the amount of torque transmitted by the torque converter by adjusting the torque converter lock-up clutch in response to various engine operating conditions, or based on a driver-based engine operation request.

Torque output from the automatic transmission 28 may in turn be relayed to wheels 34 to propel the vehicle. Specifically, automatic transmission 28 may adjust an input driving torque at the input shaft (not shown) responsive to a vehicle traveling condition before transmitting an output driving torque to the wheels.

Further, wheels 34 may be locked by engaging wheel brakes 36. In one example, wheel brakes 36 may be engaged in response to the driver pressing his foot on a brake pedal (not shown). In the same way, wheels 34 may be unlocked by disengaging wheel brakes 36 in response to the driver releasing his foot from the brake pedal.

A mechanical oil pump 38 may be in fluid communication with automatic transmission 28 to provide hydraulic pressure to engage various clutches, such as forward clutch 30 and/or torque converter lock-up clutch 32. Mechanical oil pump 38 may be operated in accordance with torque converter 26, and may be driven by the rotation of the engine or transmission input shaft, for example. Thus, the hydraulic pressure generated in mechanical oil pump 38 may increase as an engine speed increases, and may decrease as an engine speed decreases. An electric oil pump 40, also in fluid communication with the automatic transmission but operating independent from the driving force of engine 22 or transmission 28, may be provided to supplement the hydraulic pressure of the mechanical oil pump 38. Electric oil pump 40 may be driven by a motor (not shown) to which an electric power may be supplied, for example by a battery (not shown).

A controller 42 may be configured to receive inputs, such as from engine 22, transmission 28, and/or various sensors, and trigger one or more actuators (e.g., torque actuator 24) based on the inputs. In some examples, explained in more detail below, the controller may be configured to control coolant flow from a high temperature loop (for example, an engine coolant loop) to a heat exchanger and control the flow of coolant from a low temperature loop to the heat exchanger. As one example, the coolant flow from low temperature loop to heat exchanger may be controlled through a command sent by the controller to a bypass valve upstream of the heat exchanger based on temperature of coolant in the low temperature coolant loop. As a second example, the controller may send a command for the opening or closing of a coolant valve within the dual loop cooling system based upon a temperature of coolant in the high temperature cooling loop. FIGS. 2-5 describe in further details the configuration and operation of the vehicle dual loop cooling system.

FIG. 2 illustrates a dual loop system 200 including a low temperature loop 202 (may also be referred as the first coolant loop) and a high temperature loop 204 (may also be referred as the second coolant loop), each coupled to a heat exchanger 206. In one example, the low temperature loop 202 may be a liquid (for example, water) coolant loop, which may cool each of a condenser of an air conditioner, a charge air cooler, and/or transmission oil cooler (described in details below with reference to FIG. 3). The high temperature loop 204 may be an engine coolant loop, cooling an engine, for example the engine 22 of FIG. 1, for optimal engine functioning. Components of the high temperature loop are described below with reference to FIG. 3.

A bypass valve 210 along the low temperature loop 202 may be positioned to flow a first coolant in the low temperature loop 202 or to direct the first coolant through a first conduit 220 towards the heat exchanger 206. The bypass valve 210 may be a multi-position valve. In some examples, the bypass valve 210 may be a two-way valve, where the bypass valve 210 may be adjusted to a first position, where some of the coolant from the low temperature loop 202 may flow through the first conduit 220 towards the heat exchanger 206. The bypass valve 210 may control flow of coolant to the heat exchanger 206, without blocking coolant flow to other components of the low temperature loop. The volume of coolant flowing towards the heat exchanger through the bypass valve 210 during the first position may depend on a degree of opening of the bypass valve 210. The bypass valve 210 may be further adjusted to a second position where substantially all of the coolant flows through the low temperature loop, and no coolant flows through the first conduit 220 to the heat exchanger 206. In some examples, the bypass valve 210 may be a continuously variable valve and may be adjusted to any position between the first position and the second position. In one example, the bypass valve may be a thermally actuated valve (for example, the bypass valve includes a temperature sensitive wax element). In another example, the bypass valve may be an electrically actuated valve. The position of the bypass valve may be regulated by a controller, for example, the controller 42 of FIG. 1, and will be discussed below with reference to FIG. 4.

The first conduit 220 may flow the first coolant into the heat exchanger 206 along a first set of heat exchange tubes 214. The first set of heat exchange tubes 214 inside the heat exchanger 206 may include multiple flow tubes such that a large surface area of the first set of exchange tubes 214 is in heat exchange relationship with a heat exchange material 208 inside the heat exchanger 206. The first coolant flowing through the first set of heat exchange tubes inside the heat exchanger 206 may be maintained separate from the heat exchange material and may not mix with the heat exchange material 208. The first coolant flowing through the first set of heat exchange tubes 214 may flow through a second conduit 222 from the heat exchanger back to the low temperature loop 202.

A second coolant flowing through the high temperature loop may be directed to flow towards the heat exchanger through a control valve 212. The control valve 212 may be a multi-position valve. In some examples, the control valve 212 may be a two-way valve, where the control valve 212 may be adjusted to a first position, where some of the coolant from the high temperature loop 204 may flow through the third conduit 224 towards the heat exchanger 206. The control valve 212 may control flow of coolant to the heat exchanger 206, without blocking coolant flow to other components of the high temperature loop. The volume of coolant flowing towards the heat exchanger through the control valve 212 during the first position may depend on a degree of opening of the control valve 212. The control valve 212 may be further adjusted to a second position where substantially all of the second coolant flows through the high temperature loop, and no coolant flows through the third conduit 224 towards the heat exchanger 206. In some examples, the control valve 212 may be a continuously variable valve and may be adjusted to any position between the first position and the second position. In one example, the control valve may be a thermally actuated valve (for example, the control valve may include a temperature sensitive wax element). In another example, the control bypass valve may be an electrically actuated valve. The position of the control valve may be regulated by a controller, for example, the controller 42 of FIG. 1.

The second coolant may flow along a third conduit 224 towards the heat exchanger 206. The third conduit 224 may flow the second coolant into the heat exchanger 206 along a second set of heat exchange tubes 216. The second set of heat exchange tubes 216 inside the heat exchanger may include multiple flow tubes such that a large surface area of the second set of heat exchange tubes 216 is in heat exchange relationship with the heat exchange material 208 inside the heat exchanger 206. The second coolant flowing through the second set of tubes inside the heat exchanger 206 may be maintained separate from the heat exchange material and may not mix with the heat exchange material 208. The first coolant flowing through the first set of heat exchange tubes 214 and the second coolant flowing through the second set of tubes may not be in heat exchange relationship with each other directly but may each be in heat exchange relationship with the heat exchange material. The second coolant may flow through a fourth conduit 226 from the heat exchanger back to the high temperature loop 204.

The heat exchange material 208 may be a phase change material (PCM). The first coolant in the first set of heat exchange tubes may transfer cooling capacity to the PCM without mixing with either the PCM or the second coolant. The PCM may transfer cooling capacity to the second coolant in the second set of heat exchange tubes. The transfer of cooling capacity to and from the PCM may depend on a temperature of the first coolant and the second coolant relative to the temperature of the PCM. The PCM may have a freezing temperature higher than the a maximum temperature of the low temperature coolant loop, such that the PCM may remain in a solid state while the first coolant is flowing in the first set of heat exchange tubes. In one example, the heat exchange material may be a blend of two or more PCMs, wherein each PCM may have a different freezing temperature, each freezing temperature greater than the maximum temperature of the first coolant.

Now turning to FIG. 3, a block diagram of a vehicle dual loop cooling system 300 is presented. The vehicle dual loop cooling system 300 includes an engine 321, similar to the engine 22 of FIG. 1 and includes a high temperature loop 320 and a separate, low temperature loop 340. The high temperature loop 320 may be the high temperature loop 204, and the low temperature loop 340 may be the low temperature loop 202 illustrated in FIG. 2. The high temperature loop 320 and the low temperature loop 340 may be coupled to a heat exchanger 366. The heat exchanger 366 may be the same as the heat exchanger 206 illustrated in FIG. 2

The high temperature loop 320 may be an engine coolant loop for the engine 321, wherein coolant may flow through a coolant jacket of an engine block 322, through a coolant jacket of an engine cylinder head 324, and through a coolant jacket of a turbocharger 326, to a coolant valve 331 at a coolant flow junction 328. Coolant from the coolant valve 331 may be directed to a first radiator 332, and from the first radiator 332 via a control valve 330 to a pump 334. The high temperature coolant loop may include additional components, for example, a heater core, one or more temperature sensors, additional thermal exchange and storage devices, etc. Coolant within the high temperature loop 320 may circulate through any of the components listed above without mixing with coolant from the low temperature loop 340. As used herein, "without mixing with coolant from the low temperature coolant loop" refers to a coolant flow from a first component to a second component (e.g., from the engine to the first radiator to the pump) that is comprised solely of coolant from the high temperature loop, regardless of conditions. That is, only coolant from the high temperature loop flows through and between the components, and not coolant from the low temperature coolant loop.

Coolant from the first radiator 332 may flow to the control valve 330, to the pump 334, and to the engine block 322 coolant jacket without flowing through intervening components and without mixing with coolant from the low temperature loop 340. However, in some examples, intervening components may exist between the pump 334 and the engine block 322, for example, the coolant may flow through the cylinder head coolant jacket before flowing through the engine block. Coolant in the engine block 322 coolant jacket may flow to the engine cylinder head 324 coolant jacket and/or turbocharger 326 coolant jacket without flowing through intervening components and without mixing with coolant from the low temperature loop 340.

Coolant from the engine cylinder head 324 and the turbocharger 326 coolant jackets may flow to the coolant flow junction 328 and then to the first radiator 332 when the coolant valve 331 is open, without mixing with coolant from the low temperature loop 340. In some examples, the coolant valve 331 may be a thermally actuated valve and may include a heat sensitive wax element, which may open and close the valve responsive to temperature of the coolant. In another example, the coolant valve 331 may be electrically actuated. The coolant valve 331 may be closed to allow coolant flow to remain in the engine 321 and to expedite coolant heating during a cold engine start. The coolant valve 331 may direct coolant back to the pump 334 without flowing to the first radiator 332 and without mixing with coolant from the low temperature loop 340.

Coolant may flow from the control valve 330, to the heat exchanger 366, and back to a conduit downstream of the control valve 330 and upstream of the pump, without mixing with coolant from the low temperature loop 340.

Now turning to the low temperature loop 340, it comprises a second radiator 342, an electric coolant pump 344, a water-cooled charge air cooler (WCAC) 346, a water-cooled air conditioner condenser (WCOND) 348, and a water-cooled transmission oil cooler (WTOC) 350. Further, other embodiments of the system, additionally or alternatively, may include fuel coolers, EGR coolers, electronics, and inverter system control for hybrid electric vehicles. Therefore, coolant flow may deviate from the description below with the introduction of additional components. Coolant may flow from the second radiator 342 to each of the WCAC 346, to the WCOND 348, and to the WTOC 350 without mixing with coolant from the high temperature loop 320. As used herein "without mixing with coolant from the high temperature coolant loop" refers to a coolant flow from a first component to a second component (e.g., from the second radiator to the WTOC) that is comprised solely of coolant from the low temperature loop, regardless of conditions. That is, only coolant from the low temperature loop flows through and between the components, and not coolant from the high temperature coolant loop.

Coolant may flow from the second radiator 342, to each of the WCOND, WCAC, and WTOC and cool each of the components by absorbing heat. The coolant after absorbing heat may flow to a coolant line 351. A bypass valve 329 may direct coolant flow from the coolant line 351 to the second radiator 342 via the pump 344 or may direct coolant to flow towards the heat exchanger 366, responsive to a temperature of the coolant in the coolant line 351. One or more temperature sensors may be coupled to the common coolant line upstream of the bypass valve 329, for example a temperature sensor 352. Regulation of the bypass valve based on temperature of the coolant in the common coolant line will be discussed further with reference to FIG. 4 below. Coolant flows to the second radiator 342 either directly from the bypass valve without entering the heat exchanger 366 or may flow through the heat exchanger 366 and back to the low temperature coolant loop, downstream of the bypass valve 329, and upstream of the pump 344.

The coolant may flow through the bypass valve 329 to the heat exchanger 366 when the coolant has additional cooling capacity that may be transferred to the PCM inside the heat exchanger. The coolant flowing from the low temperature coolant loop to the heat exchanger may remain inside a first set of heat exchange tubes when inside the heat exchanger (such as the first set of heat exchange tube 214 inside the heat exchanger 206, illustrated in FIG. 2). The coolant of the low temperature coolant loop, while flowing through the heat exchanger 366, remains separate and does not mix with heat exchange material inside the heat exchanger 366.

Coolant of the low temperature coolant loop flows out of the heat exchanger 366 and flows back towards to the second radiator 342 via the pump 344. Coolant from the WCAC 346 may flow to the electric pump 344 and then to the second radiator 342 without mixing with coolant from the high temperature loop 320. Coolant from the WCOND 348 may flow to the electric pump 344 and then to the second radiator 342 without mixing with coolant from the high temperature loop 320. Coolant from the WTOC 350 may flow to the electric pump 344 and then to the second radiator 342 without mixing with coolant from the high temperature loop 320.

In some examples, a common degas bottle 370 may be coupled to both the high temperature loop 320 and the low temperature loop 340. As shown in FIG. 3, the common degas bottle 370 is coupled by a line 371 to the low temperature loop 340 for both filling and deaerating the coolant in the low temperature loop 340. Since there is only one connection from the low temperature loop to the degas bottle, there is no transfer of coolant from the high temperature loop to the low temperature loop. A coolant line 373 couples the first radiator 332 of the high temperature loop 320 to the common degas bottle 370, which is configured to collect coolant vapors, bubbles, and/or coolant overflow and then supply the settled liquid coolant back to the high temperature loop 320 through a line 375. The coolant supplied through the line 375 is delivered to the coolant pump 334. Coolant from the coolant pump 334 may then be pumped and circulated through the engine block 322, the cylinder head 324, the turbocharger 326, and the coolant valve 331 along the high temperature loop 320, without mixing with the coolant from the low temperature loop 340. Thus, the high temperature loop 320 and the low temperature loop 340 with the common degas bottle 370 may still be considered separate coolant loops that do not mix.

Accordingly, in one example, coolant that flows through the high temperature coolant loop 320, including from the coolant pump 334 to the engine 321 and/or turbocharger 326, to the radiator via the coolant valve 331, and to the heat exchanger 366 and/or back to the pump 334 via the control valve 330, may flow through an entirety of the high temperature coolant loop without mixing with coolant from the low temperature loop 340. Likewise, coolant that flows through the low temperature loop 340, including from the coolant pump 344 to the second radiator 342, from the radiator to the WCOND, WCAC, and WTOC, and to the heat exchanger 366 and/or back to the pump 344 via the bypass valve 329, may flow through an entirety of the low temperature coolant loop without mixing with coolant from the high temperature loop 320.

In another example, the degas bottle may include two chambers, and the coolant from the high temperature loop may flow through a first chamber of the degas bottle without mixing with contents of a second chamber of the degas bottle, which may be coupled to the low temperature loop. In a further example, rather than sharing a common degas bottle between the low temperature and the high temperature loop, the coolant in the low temperature coolant loop may collect in a separate degas bottle.

The heat exchanger may include a PCM wherein a freezing temperature of the PCM may be greater than a maximum temperature of the coolant in the low temperature loop. The bypass valve 329 may direct coolant flow from the low temperature loop to flow through the heat exchanger 366 without any mixing between the PCM and the coolant. The coolant remains separated from the PCM as the coolant may be in heat exchange tubes within the PCM. The coolant may transfer cooling capacity to the PCM (absorb heat from the PCM), and the PCM is cooled further.

Cooling capacity may be transferred to the PCM inside the heat exchanger from coolant in the low temperature loop. The bypass valve 329 may direct coolant flow from the low temperature loop to flow through the heat exchanger 366 without any mixing between the PCM and the coolant. The coolant remains separated from the PCM as the coolant may be in heat exchange tubes within the PCM. The coolant may transfer cooling capacity to the PCM.

The cooling capacity stored in the PCM may be transferred from the heat exchanger to the high temperature loop. The control valve 330 may direct coolant flow from the high temperature loop to flow through the heat exchanger 366 without any mixing between the PCM and the first coolant. The coolant remains separated from the PCM as the coolant may be in heat exchange tubes in contact with the PCM. The PCM may transfer cooling capacity to the coolant of the high temperature coolant loop. After transfer of cooling capacity from the PCM to the coolant, the coolant flows through the high temperature loop cooling the engine and associated components to maintain optimal engine temperature.

Figure 4:
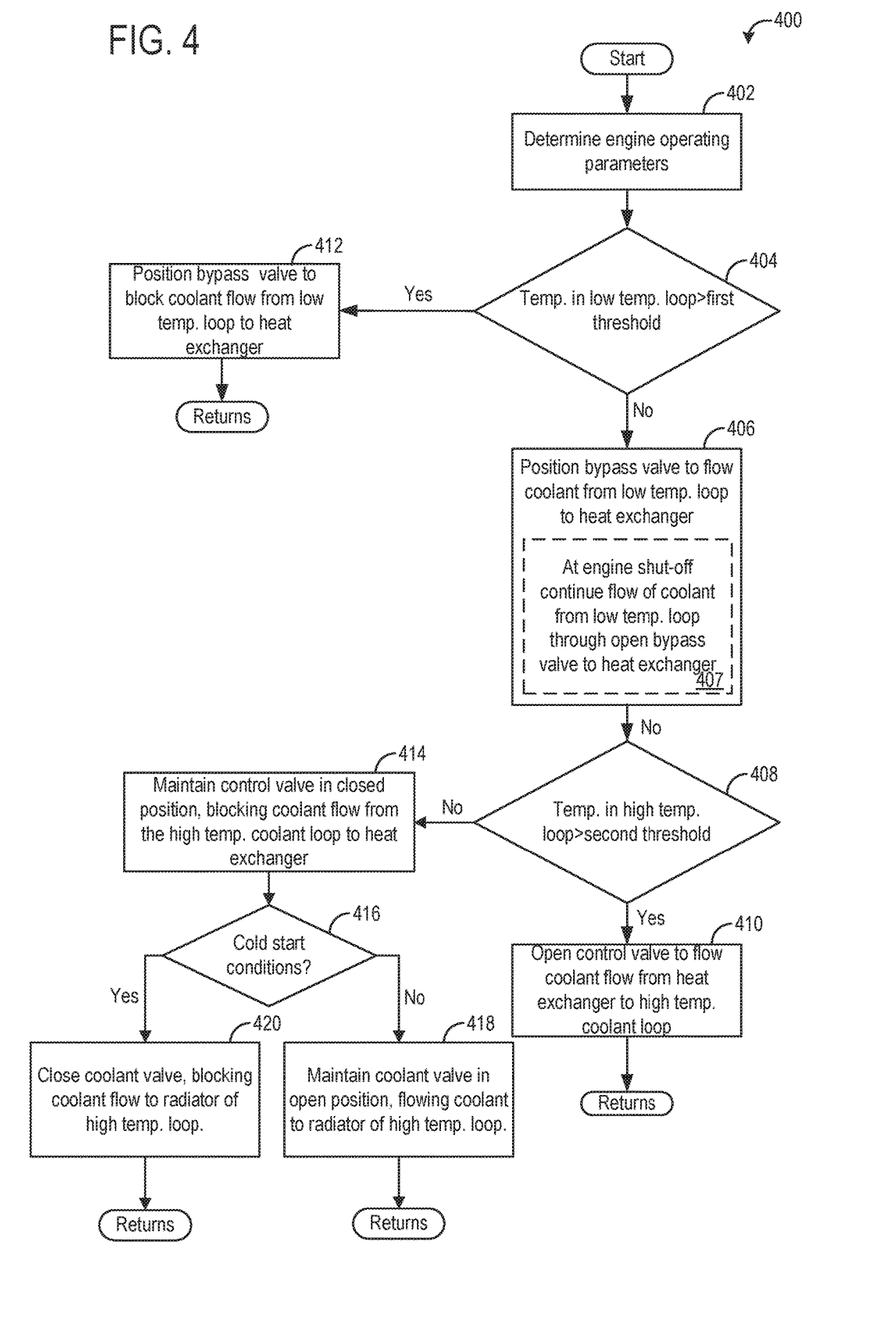
FIG. 4 shows a flow chart illustrating a method for controlling coolant flow in the dual loop coolant system.
Figure 5:
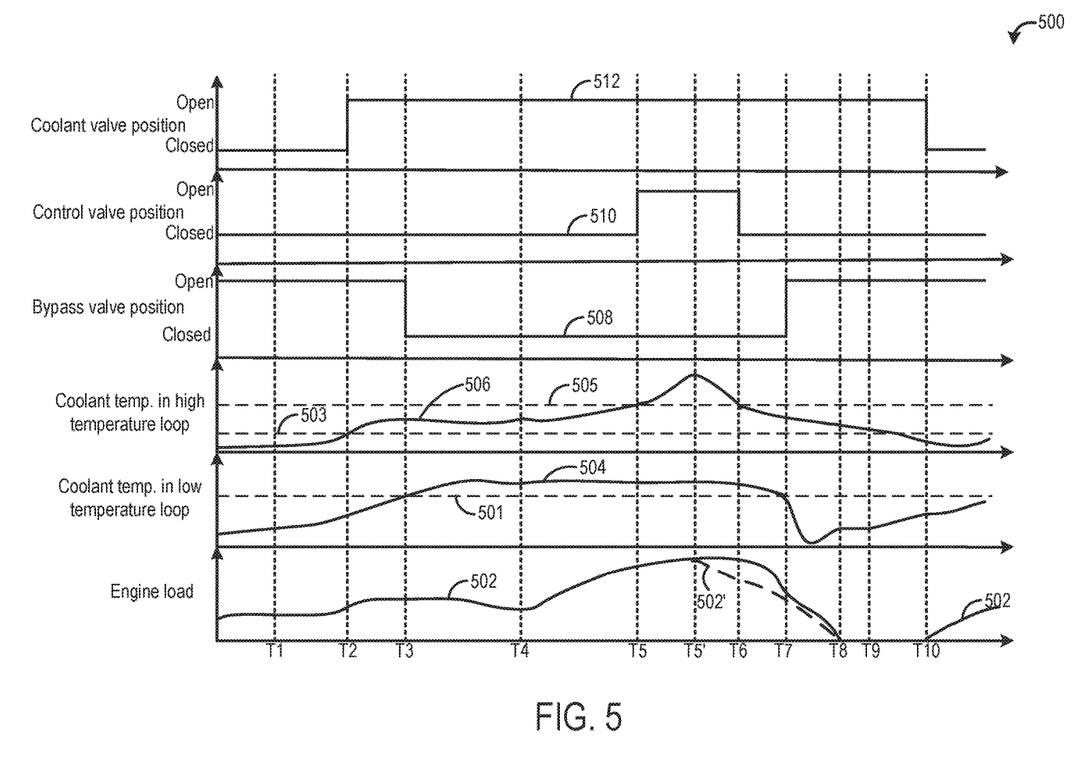
FIG. 5 illustrates an example operation map of a dual loop cooling system of a vehicle.

Turning now to FIG. 4, a method 400 for storing cooling capacity from the low temperature loop in a heat exchanger and transferring the cooling capacity from the heat exchanger to coolant in the high temperature loop is illustrated. The high temperature coolant loop may be an engine coolant loop and may be the high temperature coolant loop of FIGS. 2 and 3. The low temperature loop may be a water coolant loop cooling the air conditioner condenser, charge air cooler, transmission oil, etc., similar to the low temperature loop illustrated in FIGS. 2 and 3. The heat exchanger may be the heat exchanger 206 or the heat exchanger 366 illustrated in FIGS. 2 and 3, respectively.

Instructions for carrying out method 400 and the rest of the methods included herein may be executed by a controller, such as the controller 42 of FIG. 1, based on instructions stored on a memory of the controller and in conjunction with signals received from sensors of the engine system, such as the temperature sensor 352 described above with reference to FIG. 3. The controller may employ engine actuators of the engine system to adjust engine operation, for example actuating the bypass valve 329 and the control valve 330 of FIG. 3, according to the methods described below.

Method 400 may begin by determining the current engine parameters (e.g., engine speed, engine load, engine temperature) at 402. At 404, the controller may determine if coolant temperature in the low temperature coolant loop (such as the low temperature loop 202 of FIG. 2 and the low temperature loop 340 of FIG. 3) is more than a first threshold. In one example, the threshold temperature may be 70° C.

If yes, it indicates that the coolant in the low temperature coolant loop does not have additional cooling capacity available, and the method 400 proceeds to 412. The low temperature coolant loop may not have additional cooling capacity to transfer to the heat exchanger when a temperature of the coolant in the low temperature loop is more than the first threshold and/or when the temperature of the WCOND, WTOC, and/or WCAC are close to or at an upper limit of normal working temperature of each of the components. As a result, all the cooling capacity available in the low temperature loop is used for cooling each of the components of the low temperature loop, and is not transferred to the heat exchanger for storage.

At 412, the bypass valve of the low temperature coolant loop (for example, the bypass valve 329 of the low temperature loop 340 of FIG. 1) is positioned to block coolant flow from the low temperature coolant loop to a coupled heat exchanger (for example, heat exchanger 366 of FIG. 3). The coolant continues to flow in the low temperature coolant loop, through a radiator and then to cooling each of the WCOND, WTOC, WCAC, as described above with reference to FIG. 3, without any heat exchange with the heat exchanger.

However, if at 404 the coolant temperature in the low temperature loop is less than the first threshold, additional cooling capacity is available in the coolant, and hence the method 400 proceeds to 406. At 406, the bypass valve is positioned to direct coolant flow from the low temperature coolant loop towards the heat exchanger. The coolant of the low temperature coolant loop may transfer cooling capacity to a PCM (e.g., decrease the temperature of the PCM) inside the heat exchanger. The coolant may flow through a first set of heat exchange tubes inside the heat exchanger, such that the coolant does not mix/remains separate from the contents of the heat exchanger. After transferring coolant capacity to the heat exchanger, the warmer coolant may flow back to the low temperature coolant loop and continue flowing through the components of the low temperature loop. In one example, as indicated at 407, if the engine is shutoff, the bypass valve may continue to be in the open position as the temperature of the coolant in the low temperature loop is below the first threshold at engine shut-off. The pump of the low temperature loop may remain operational to flow coolant from the low temperature loop through the open bypass valve to the heat exchanger to transfer cooling capacity from the coolant to the heat exchanger.

The method 400 at 408 determines if a temperature of the high temperature coolant loop is more than a second threshold, wherein the second threshold is higher than the first threshold (for example, the first threshold temperature may be 70° C. and the second threshold temperature may be 90° C.). If the temperature of the coolant in the high temperature coolant loop is not more than the second threshold, the method 400 proceeds to 414.

At 414, the coolant of the high temperature loop continues to flow along the radiator of the high temperature loop and to the engine and the associated engine components without flowing through the coupled heat exchanger. The coolant temperature in the high temperature loop is maintained in the optimal range as the radiator adequately cools the coolant in the high temperature loop.

The method 400 proceeds to 416 to assess if the engine is operating under cold start conditions. During cold start conditions, the temperature of the engine may be less than a minimum engine operating temperature (e.g., less than 100° F.). During cold start conditions, coolant in the high temperature loop may bypass the radiator in order to avoid heat loss at the radiator, thus quickly warming the engine and the associated components, to increase combustion efficiency and to reduce emissions. If the engine is operating with cold start conditions at 416, the method 400 proceeds to 420, where the coolant valve (for example, the coolant valve 331 of FIG. 3) is closed to direct coolant flow away from the radiator and towards the engine, to expedite engine warm up. Hence, no transfer of heat occurs between the coolant in the high temperature coolant loop and the radiator of the high temperature loop, and the coolant in the high temperature loop circulates through the engine to expedite engine warm-up during cold start. The method 400 then returns.

If the engine is not operating with cold start conditions at 416, the method 400 proceeds to 418, where the coolant valve is maintained in an open position, flowing coolant from the engine and associated components to the radiator of the high temperature loop for reducing the temperature of the coolant, as the coolant continues to flow through the engine and the associated components to cool the engine. The method 400 then returns.

At 408, if the temperature of the high temperature loop is more than second threshold, the high temperature coolant needs to be cooled down to be able to continue cooling the engine and the associated components. In one example, high engine load and/or high engine speed may generate excess heat and, if cooling were provided only via the radiator, overheating of the engine may result, which may cause engine degradation, or the engine may be derated to prevent overheating, which may reduce engine efficiency and performance. Hence, the method 400 proceeds to 410.

At 410, the coolant valve is positioned to flow coolant from the high temperature loop to the heat exchanger. In one example, the coolant valve may be thermally actuated (with a wax element) and respond to the temperature of the coolant in the high temperature loop more than the second threshold may be actuated to an open position. In another example, the coolant valve may be electrically actuated valve. The coolant form the high temperature loop may be directed to flow inside the heat exchanger through a second set of heat exchange tubes, without mixing with the contents of the heat exchanger. There is no direct transfer of heat between the first set of heat exchange tubes with the low temperature coolant and the second set of heat exchanger tubes with the high temperature coolant.

Heat from the coolant flowing through the second set of heat exchange tubes may be transferred to the PCM of the heat exchanger, wherein the PCM of the heat exchanger is at a lower temperature than the coolant in the high temperature coolant loop. As explained above, cooling capacity is transferred from the low temperature coolant to the PCM at 406. As heat is absorbed at the heat exchanger from the high temperature coolant (through the second set of heat exchange tube that maintain the coolant separated from the contents of the heat exchanger), the high temperature coolant temperature reduces and the coolant flows back to the high temperature loop. The coolant temperature now in the high temperature loop is less than the second threshold, and may continue cooling the coupled engine components to maintain the engine in the optimal temperature range.

The flow of coolant from the low temperature loop through the first set of heat exchange tubes and flow of coolant from the high temperature loop through the second set of heat exchange tube inside the heat exchanger may not happen simultaneously. In one example, the cooling capacity may be transferred to the heat exchanger from the low temperature coolant loop flowing through the first set of heat exchange temperature and stored in the heat exchanger. At a later point of time, coolant from the high temperature coolant loop may flow through the second set of heat exchange tubes and cooling capacity may be transferred to from the heat exchanger to the coolant in the second set of heat exchange tube. In another example, while coolant from the low temperature coolant loop is flowing through the first set of heat exchange tubes, transferring cooling capacity to the PCM, simultaneously coolant from the high temperature loop may flow through the second set of heat exchange tubes and cooling capacity may be transferred from the PCM to the coolant in the second set of heat exchange tubes. The transfer of cooling capacity may not be directly between the coolant in the first set of heat exchange tubes and the coolant in the second set of heat exchange tubes but may be through the PCM inside the heat exchanger. At no point is there any mixing between the PCM and the coolant in the first set of heat exchange tubes and the coolant in the second set of heat exchange tubes inside the heat exchanger. The method 400 then returns.

FIG. 5 shows an example operating sequence 500 of a vehicle dual loop cooling system coupled to a heat exchanger. The example operating sequence 500 may be generated during operation of the high temperature loop and the low temperature loop discussed above with reference to FIGS. 1-4. Plotted along the Y-axis is a plot 502 indicating the engine load increasing along the Y-axis. Temperature of the coolant in the low temperature loop and temperature of the coolant in the high temperature loop are illustrated by plots 504 and 506, respectively. A first threshold temperature of the low temperature loop is indicated by 501, and a second threshold and a third threshold temperature of the high temperature loop are indicated by 505 and 503, respectively. The first threshold 501 may be less than the second threshold 505, at least in one example. The third threshold 503 may be less than the second threshold 505. In some examples, the third threshold 503 may be more than the first threshold 50, or the third threshold 503 may be equal to or less than the first threshold 501. The position of the bypass valve in the low temperature loop (e.g., the bypass valve 329) is indicated by a plot 508, the position of the control valve (e.g., the control valve 330) is indicated by a plot 510, and the position of the coolant valve (e.g., the coolant valve 331) is indicated by a plot 512. The X-axis represents time, increasing from left side of the figure to the right side of the figure. Vertical markers (with dashed lines) indicate the times of interest.

Prior to T1, the bypass valve (plot 508) along the low temperature loop is in the open position, as the temperature of the low temperature loop (plot 504) is below the first threshold 501. The open bypass valve directs coolant from the low temperature loop to the heat exchanger to transfer cooling capacity to the heat exchanger. The temperature of the coolant in the high temperature loop (plot 506) is less than the third threshold 503, due to for example, cold start conditions. Hence, the control valve is in the closed position (plot 510), blocking flow of coolant from the high temperature loop to the heat exchanger, and instead directing coolant to flow along the high temperature loop to expedite engine warm up. Prior to T1, the coolant valve is also in the closed position (plot 512), directing coolant flow of the high temperature loop away from the radiator of the high temperature loop and towards the engine, to expedite engine warm up. Engine load prior to T1 remains unaltered, as illustrated by the plot 502.

During T1-T2, the temperature of the high temperature loop (plot 506) continues to be less than the third threshold 503 (for example, during cold start conditions). Hence, the control valve (plot 510) continues to be in the closed position, blocking flow of coolant from the high temperature loop to the heat exchanger, and instead directing coolant to flow along the high temperature loop to transfer heat to the engine. The coolant valve (plot 512) also continues to be in the closed position, directing coolant flow of the high temperature loop away from the radiator and towards the engine, to expedite engine warm up. As the temperature of the coolant in the low temperature loop (plot 504) is still below the first threshold 501, the bypass valve continues to be in the open position, directing coolant from the low temperature loop to the heat exchanger. As cooling capacity is transferred from the coolant in the low temperature loop to the heat exchanger, the temperature of the low temperature loop (plot 504) gradually increases during T1-T2. Additionally, as the engine warms up, the temperature of the coolant in the high temperature loop (plot 506) also increases during T1-T2.

At T2, the coolant temperature in the high temperature loop (plot 506) reaches the third threshold 503. As a result, the coolant valve is positioned in the open position at T2, directing coolant flow to the radiator of the high temperature loop. During T2-T3, the coolant temperature in the high temperature loop (plot 506) is between the second threshold 505 and the third threshold 503, which is the normal temperature range for cooling the engine. Since the coolant temperature is not more than the second threshold, the control valve (plot 510) continues to be in the closed position, directing coolant to flow along the high temperature loop, without flowing to the heat exchanger. The bypass valve (plot 508) continues to be in the open position, directing coolant in the low temperature loop to flow to the heat exchanger to transfer cooling capacity to the heat exchanger.

At T3, the temperature of the low temperature loop may reach the first threshold 501, indicating that additional cooling capacity is not available in the low temperature loop for transferring to the heat exchanger. In one example, the coolant in the low temperature loop may increase in temperature responsive to an operator activating the air conditioner, hence engaging the AC compressor and increasing the cooling demand of the low temperature loop. Therefore, the bypass valve is closed, blocking coolant flow from the low temperature loop to the heat exchanger. The bypass valve in the closed position directs coolant flow towards the components of the low temperature loop, such as WCAC, WTOC, WCOND, etc.

During T3-T4, the temperature of the coolant in the high temperature loop (plot 506) is between the second threshold 505 and the third threshold 503. The control valve is in the closed position (plot 510), as the coolant in the high temperature loop does not need to be cooled by the heat exchanger. The coolant valve is in the open position (plot 512), flowing the coolant in the high temperature loop through the radiator of the high temperature loop.

During T4-T5, the temperature of the coolant in the low temperature loop continues to be above the first threshold 501. The bypass valve is maintained in the closed position, blocking flow of the coolant from the low temperature loop to the heat exchanger, as no cooling capacity is available in the coolant of the low temperature loop for transferring to the heat exchanger. Between T4-T5, as the engine load (plot 502) increases (for example, during uphill driving), the temperature of the coolant in the high temperature loop (plot 506) increases too. During T4-T5, the coolant valve continues to be in the open position directing coolant in the high temperature loop to flow through the radiator, and the control valve continues to be in the closed position, blocking coolant flow from the high temperature loop to the heat exchanger as the temperature of the coolant in the high temperature loop is below the second threshold 505.

As the engine load increases during T4-T5, the temperature of the coolant in the high temperature loop continues to increase and is at the second threshold at T5. Responsive to the coolant in the high temperature loop reaching the second threshold at T5, the control valve (plot 510) is opened to direct coolant from the high temperature loop to the heat exchanger to transfer heat to the heat exchanger. The coolant valve continues to be in the open position (plot 512) during T5-T6, directing coolant in the high temperature loop to flow through the radiator.

During T5-T6, the coolant temperature of the high temperature loop (plot 506) is above the second threshold 505 and starts decreasing without reduction in the engine load (plot 502). The temperature of the high temperature coolant decreases due to the open control valve directing coolant from the high temperature loop to the heat exchanger to transfer heat from the coolant to the heat exchanger.

However, if no cooling capacity is available to reduce the temperature of the coolant in the high temperature loop (for example, in a second engine with no cooling capacity transfer between the low temperature loop and the high temperature loop through the heat exchanger), the second engine operates at a load indicated by plot 502' during T5'-T6. Even though the desired load in the second engine may be same as the engine load 502 during T5-T6, the second engine operates at the load 502' which is less than the engine load 502, indicating that the second engine is de-rated during T5'-T6 to reduce the temperature of the coolant in the high temperature loop (plot 506) to reach the second threshold 505.

At T6, the temperature of the high temperature loop is at the second threshold 505, and consequently the control valve (plot 510) is closed at T6, blocking coolant flow from the high temperature loop to the heat exchanger. As the coolant temperature in the low temperature loop continues to be above the first threshold 501 during T5-T6, the bypass valve is maintained in the closed position, blocking coolant flow from the high temperature loop to the heat exchanger, as no cooling capacity is available for transfer from the low temperature loop to the heat exchanger.

At T7, the coolant temperature in the low temperature loop is at the first threshold 501 indicating that additional cooling capacity is available in the low temperature loop during T7-T8. In one example, additional cooling capacity may be available in the low temperature loop after turning off the air conditioner of the vehicle. During T7-T8, the bypass valve is in the open position, directing coolant flow from the low temperature loop to the heat exchanger to transfer the cooling capacity to the heat exchanger.

The coolant temperature in the high temperature loop decreases (e.g., remains between the second threshold and the third threshold) during T6-T8 along with decrease in engine load (plot 502). The control valve is in the closed position, and the coolant valve continues to be in the open position between T6-T8.

At T8, the engine is turned off and hence engine load is zero. During T8-T10, while the engine is turned off, the coolant in the low temperature loop may continue to transfer cooling capacity to the heat exchanger by flowing through the open bypass valve to the heat exchanger. The pump of the low temperature loop (for example, the pump 344 of the low temperature loop 340 of FIG. 3) may continue operating while the engine is shut off, flowing the coolant along the low temperature loop and the heat exchanger. During T8-T10, the temperature of the coolant in the high temperature loop may continue decreasing as the engine heat is dissipated to the environment. The control valve is in the closed position and the coolant valve remains in the open position until the coolant in the high temperature decreases in temperature enough to cause the coolant valve to close (as shown, around time T10).

At T10, the engine is re-started and the engine load (plot 502) starts increasing. The temperature of the coolant in the low temperature loop (plot 504) is still below the first threshold at T10, and hence, the bypass valve is open (plot 508), directing coolant flow from the low temperature loop to the heat exchanger to transfer cooling capacity to the heat exchanger. The temperature of the coolant in the high temperature loop is below the third threshold 503 at T10. Hence, the control valve is in the closed position (plot 510), blocking flow of coolant from the high temperature loop to the heat exchanger, and instead directing coolant to flow along the high temperature loop to expedite engine warm up. The coolant valve is also in the closed position (plot 512), directing coolant flow of the high temperature loop away from the radiator of the high temperature loop and towards the engine, to expedite engine warm up.

In this way, additional cooling capacity from a low temperature coolant loop may be transferred to and stored in a heat exchanger. The cooling capacity of the heat exchanger may then be used to cool a high temperature coolant loop, such as engine coolant loop, to cool the engine and associated components and maintain the engine in optimal temperature range. The transfer of cooling capacity to the PCM from the low temperature coolant loop happens without mixing of the PCM and the coolant in the low temperature coolant loop. Similarly, the transfer of cooling capacity from the PCM to the high temperature coolant loop happens without mixing of the PCM and the coolant in the high temperature loop.

The technical effect of transferring cooling capacity from a low temperature loop to a heat exchanger for storing and then transferring the stored cooling capacity from the heat exchanger to the high temperature coolant loop includes maintaining the engine and associated components in an optimal temperature range by making use of cooling capacity available within the vehicle dual loop system, thus making the process more energy efficient. The transfer of additional cooling capacity available to the high temperature loop through a heat exchanger or a thermal storage device may happen even at high engine load and speed without derating the engine, thus maintaining optimal engine and vehicle operation. Additionally, use of a liquid coolant in the low temperature loop (instead of a refrigerant that may result in increased engagement of a compressor, which may increase fuel consumption), simplifies and reduces the cost and complexity of the dual loop cooling system.

The use of a liquid-coolant based low temperature loop to transfer and store additional cooling capacity for cooling a high-temperature loop, such as the system described above, may provide an efficient and cost-effective way to transfer cooling capacity to the high-temperature loop, in particular relative to systems that may rely on a refrigerant-based low temperature loop that are configured to operate with the air conditioning system of the vehicle. For example, the liquid coolant low temperature loop described herein may allow for reduced engine load and hence reduced fuel consumption, and may also be operated while the engine is off, compared to refrigerant-based systems that may increase the engine load along with more fuel consumption and may not be operated while the engine is turned off. The liquid coolant low temperature loop may also prevent the generation of excess heat that may be observed while operating the air conditioner compressor, thus lowering the cooling demand of the coolant in the coolant loops. Furthermore, use of the liquid coolant low temperature loop described herein may increase air conditioner cooling efficiency in the passenger cabin of the vehicle relative to using the air conditioning system refrigerant loop to further cool the high temperature loop.

An example system comprises a first coolant loop, a second coolant loop, separate from the first coolant loop, a heat exchanger configured to transfer heat between the first coolant loop and the second coolant loop, a bypass valve positioned between the first coolant loop to the heat exchanger, and a control valve positioned between the second coolant loop and the heat exchanger. In the preceding example, additionally or optionally, the first coolant loop is a low temperature liquid coolant loop including a first radiator, where coolant exiting the first radiator flows to the heat exchanger. In any or all of the preceding examples, additionally or optionally, coolant exiting the first radiator flows to the heat exchanger through each of an air conditioner condenser, a charge air cooler, and a transmission oil cooler. In any or all of the preceding examples, additionally or optionally, wherein at a first position of the bypass valve, coolant flows from the first radiator to the heat exchanger and coolant flows from the first radiator to each of the air conditioner condenser, the charge air cooler, and the transmission oil cooler and at a second position of the bypass valve, coolant flow from the first radiator to the heat exchanger is blocked, while coolant continues to flow from the first radiator to each of the air conditioner condenser, the charge air cooler, and the transmission oil cooler. In any or all of the preceding examples, additionally or optionally, at a first position of the control valve, coolant from the second coolant loop flows through the heat exchanger and flows back to the second coolant loop and at a second position of the control valve, coolant from the second coolant loop is blocked from flowing through the heat exchanger. In any or all of the preceding examples, additionally or optionally, the system further comprises a controller storing computer-readable instructions executable to position the bypass valve in the first position of the bypass valve responsive to a temperature of the first coolant loop being less than a first threshold, and position the control valve in the first position of the control valve responsive to a temperature of the second coolant loop being more than a second threshold, the second threshold being more than the first threshold. In any or all of the preceding examples, additionally or optionally, the second coolant loop is a high temperature engine coolant loop including at least an engine coolant jacket and a second radiator, where coolant exiting the engine coolant jacket flows to the second radiator. In any or all of the preceding examples, additionally or optionally, the heat exchanger includes a phase change material in heat exchange relation with each of a first set of heat exchange tubes and a second set of heat exchange tubes, the first set of heat exchange tubes configured to flow coolant from the first coolant loop through the heat exchanger, the second set of heat exchange tubes configured to flow coolant from the second coolant loop through the heat exchanger. In any or all of the preceding examples, additionally or optionally, the PCM remains separate from the coolant flowing through the first set of heat exchange tubes and from the coolant flowing through the second set of heat exchange tubes. In any or all of the preceding examples, additionally or optionally, a temperature of the first coolant loop is maintained below a freezing temperature of the PCM. In any or all of the preceding examples, additionally or optionally, the bypass valve is a thermally actuated multi-position valve.

An example method comprises responsive to a first condition, transferring cooling capacity from a first coolant loop to a heat exchanger, the first condition including a temperature of the first coolant loop being less than a first threshold, storing cooling capacity transferred from the first coolant loop in a phase change material (PCM) inside the heat exchanger, and responsive to a second condition, transferring heat from a second coolant loop to the heat exchanger, the second condition including a temperature of the second coolant loop being more than a second threshold, the second threshold being higher than the first threshold. In the preceding example, additionally or optionally, the method further comprises responsive to a third condition, suspending transferring of cooling capacity between the first coolant loop and the heat exchanger and suspending heat transfer from the second coolant loop to the heat exchanger, wherein the third condition includes the temperature of the first coolant loop being more than the first threshold and the temperature of the second coolant loop being less than the second threshold. In any or all of the preceding examples, additionally or optionally, the method further comprises, during each of the first, second, and third conditions, maintaining coolant in the first coolant loop and the coolant in the second coolant loop separate from each other, and separate from the PCM. In any or all of the preceding examples, additionally or optionally, the method further comprises positioning each of a first valve between the heat exchanger and the first coolant loop and a second valve between the heat exchanger and the second coolant loop in a closed position during the third condition. In any or all of the preceding examples, additionally or optionally, the method further comprises positioning the first valve in an open position during the first condition and positioning the second valve in an open position during the second condition. In any or all of the preceding examples, additionally or optionally, the first condition and the second condition occur simultaneously.

An example system comprises a heat exchanger coupled to each of a first coolant loop and a second coolant loop, a bypass valve configured to flow a first coolant from the first coolant loop through a first set of tubes inside the heat exchanger, the first set of tubes configured to maintain the first coolant separate from a phase change material (PCM) inside the heat exchanger but in heat exchange relation with the PCM, and a coolant valve configured to flow a second coolant from the second coolant loop through a second set of tubes, the second set of tubes inside the heat exchanger configured to maintain the second coolant separate from the first coolant in the first set of tubes and separate from the PCM, while maintaining the second coolant in heat exchange relation with the PCM inside the heat exchanger. In the preceding example, additionally or optionally, the system further comprises a controller storing computer-readable instructions executable to position the bypass valve in a first position to flow the first coolant through the first set of tubes, responsive to a temperature of the first coolant loop being less than a first threshold, and position the bypass valve in a second position to block the first coolant from flowing through the first set of tubes, responsive to the temperature of the first coolant loop being more than the first threshold. In any or all of the preceding examples, additionally or optionally, the computer-readable instructions are further executable to position the coolant valve in an open position to flow the second coolant through the second set of tubes, responsive to a temperature of the second coolant loop being more than a second threshold, wherein the second threshold is greater than the first threshold, and position the coolant valve in a closed position to block the second coolant from flowing through the second set of tubes, responsive to the temperature of the second coolant loop being less than the second threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    responsive to a first condition, transferring cooling capacity from a first coolant loop to a heat exchanger, the first condition including a temperature of the first coolant loop being less than a first threshold;
    storing cooling capacity transferred from the first coolant loop in a phase change material (PCM) inside the heat exchanger;
    responsive to a second condition, transferring heat from a second coolant loop to the heat exchanger, the second condition including a temperature of the second coolant loop being more than a second threshold, the second threshold being higher than the first threshold; and
    a first valve positioned between the heat exchanger and the first coolant loop for the first coolant loop to bypass the heat exchanger, and a second valve positioned between the heat exchanger and the second coolant loop for the second coolant loop to bypass the heat exchanger.

2. The method of claim 1, further comprising, responsive to a third condition, suspending transferring of cooling capacity between the first coolant loop and the heat exchanger and suspending heat transfer from the second coolant loop to the heat exchanger, wherein the third condition includes the temperature of the first coolant loop being more than the first threshold and the temperature of the second coolant loop being less than the second threshold.

3. The method of claim 2, further comprising, during each of the first, second, and third conditions, maintaining coolant in the first coolant loop and the coolant in the second coolant loop separate from each other, and separate from the PCM.

4. The method of claim 2, further comprising positioning each of the first valve between the heat exchanger and the first coolant loop and the second valve between the heat exchanger and the second coolant loop in a closed position during the third condition.

5. The method of claim 4, further comprising positioning the first valve in an open position during the first condition and positioning the second valve in an open position during the second condition.

6. The method of claim 1, wherein the first condition and the second condition occur simultaneously.

7. A system, comprising:
    a heat exchanger coupled to each of a first coolant loop and a second coolant loop;
    a bypass valve configured to flow a first coolant from the first coolant loop through a first set of tubes inside the heat exchanger, the first set of tubes configured to maintain the first coolant separate from a phase change material (PCM) inside the heat exchanger but in heat exchange relation with the PCM;
    a coolant valve configured to flow a second coolant from the second coolant loop through a second set of tubes, the second set of tubes inside the heat exchanger configured to maintain the second coolant separate from the first coolant in the first set of tubes and separate from the PCM, while maintaining the second coolant in heat exchange relation with the PCM inside the heat exchanger; and
    a controller storing computer-readable instructions executable to:
    position the bypass valve in a first position to flow the first coolant through the first set of tubes, responsive to a temperature of the first coolant loop being less than a first threshold, and
    position the bypass valve in a second position to block the first coolant from flowing through the first set of tubes, responsive to the temperature of the first coolant loop being more than the first threshold.

8. The system of claim 7, wherein the computer-readable instructions are further executable to:
    position the coolant valve in an open position to flow the second coolant through the second set of tubes, responsive to a temperature of the second coolant loop being more than a second threshold, wherein the second threshold is greater than the first threshold, and
    position the coolant valve in a closed position to block the second coolant from flowing through the second set of tubes, responsive to the temperature of the second coolant loop being less than the second threshold.

* * * * *